United States Patent
Gray

(10) Patent No.: US 10,784,694 B1
(45) Date of Patent: Sep. 22, 2020

(54) STANDING HANDBAG RACK WITH CHARGING STATION

(71) Applicant: Ronald Gray, Long Grove, IL (US)

(72) Inventor: Ronald Gray, Long Grove, IL (US)

(*) Notice: Subject to any disclaimer, the term of this patent is extended or adjusted under 35 U.S.C. 154(b) by 0 days.

(21) Appl. No.: 16/741,619

(22) Filed: Jan. 13, 2020

(51) Int. Cl.
| | |
|---|---|
| *A47B 9/16* | (2006.01) |
| *A47B 45/00* | (2006.01) |
| *H02J 7/00* | (2006.01) |
| *A47G 29/08* | (2006.01) |
| *A47B 9/14* | (2006.01) |
| *A47G 9/08* | (2006.01) |

(52) U.S. Cl.
CPC .............. *H02J 7/0044* (2013.01); *A47B 9/14* (2013.01); *A47B 9/16* (2013.01); *A47B 45/00* (2013.01); *A47G 9/083* (2013.01); *A47G 29/08* (2013.01); *H02J 7/0045* (2013.01); *A47B 2009/145* (2013.01); *A47B 2200/008* (2013.01); *A47B 2200/0021* (2013.01); *A47B 2200/0051* (2013.01); *A47B 2220/0091* (2013.01)

(58) Field of Classification Search
CPC ..... A47B 9/16; A47B 2009/145; A47B 45/00; A47G 9/083; H02J 7/0044; H02J 7/0045
USPC ....................... 108/50.02; 248/161
See application file for complete search history.

(56) References Cited

U.S. PATENT DOCUMENTS

| | | | | |
|---|---|---|---|---|
| 6,581,890 B2 * | 6/2003 | Johnson | ................. | A45D 44/04 248/161 |
| 9,124,044 B2 * | 9/2015 | Beldock | ............... | H01R 25/006 |
| 9,209,650 B2 * | 12/2015 | Nita | .......................... | H02J 7/35 |
| D761,601 S | 7/2016 | Simmons | | |
| 9,755,446 B2 * | 9/2017 | Schreiner | .............. | H02J 7/0044 |
| 10,333,320 B2 * | 6/2019 | Salinas Ruiz | ........... | H02J 50/10 |
| 2017/0063148 A1 * | 3/2017 | Wang | ................... | A47B 91/022 |
| 2019/0013684 A1 * | 1/2019 | Glenn | ................... | H02J 7/0045 |

FOREIGN PATENT DOCUMENTS

EP  2859817 A1 * 4/2015 ............ H02J 7/0044

* cited by examiner

*Primary Examiner* — Kyle R Grabowski
(74) *Attorney, Agent, or Firm* — IpHorgan Ltd

(57) ABSTRACT

A standing handbag rack with charging station, having a vertical extending support structure having an upper portion and a lower portion, a base secured to the lower portion of the vertical extending support structure, one or more hooks for receiving a handbag or the like, the hooks are secured to the standing handbag rack, a tray secured to the vertical extending support structure, the tray including one or more cable openings, the tray adapted for receiving a portable electronic device, one or more power connectors provided at the tray, the power connector adaptable for coupling to a portable electronic device, a battery housing secured to the standing handbag rack, at least one cable, the cable having a first end and a second end, the first end connected to a power connector adaptable for extending through the cable opening for coupling to a portable electronic device, and the second end extending to the battery housing for coupling to a removable and rechargeable battery, for charging the portable electronic device.

15 Claims, 5 Drawing Sheets

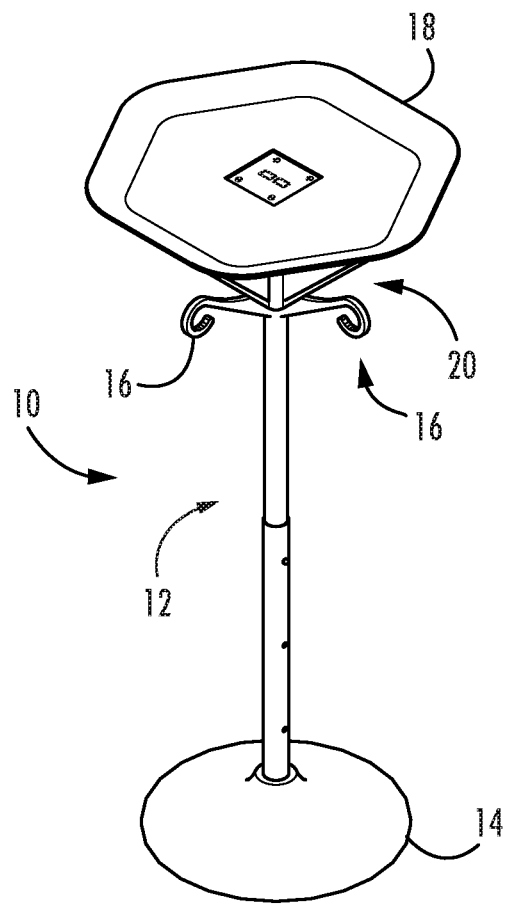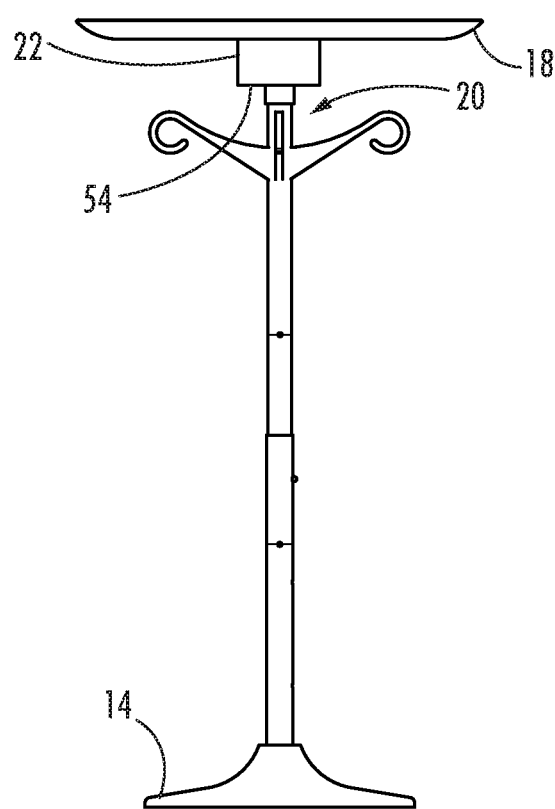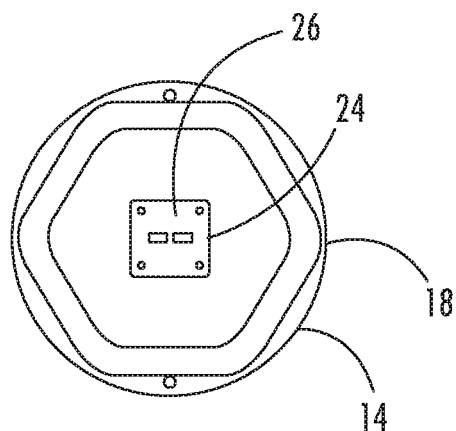

US 10,784,694 B1

STANDING HANDBAG RACK WITH CHARGING STATION

FIELD OF THE INVENTION

The present invention relates to a standing handbag racks.

BACKGROUND OF THE INVENTION

It is a routine to provide a standing rack for the temporary holding of coats, purses, handbags, and the like. For example, US Design Patent No. D761601 issued in Jul. 19, 2016 and discloses a purse organizing standing rack.

When away from home and the office, such as when dining or drinking at a restaurant, or other establishment, an individual may find it convenient to avail of a standing purse rack, coat check and other means of freeing oneself of garments and bags while dining, drinking or socializing.

As is typical, restaurants, clubs and other establishments are competing with competition for patrons. Such establishments are always attempting to improve the experience of its patrons and increase the patrons.

There continues to be an ongoing need for restaurants and other such establishments to improve the patron's experience.

SUMMARY OF THE INVENTION

The present invention enhances the experience of a patron of a restaurant or other similar establishment.

The present invention provides a standing handbag rack with a charging station for the user's personal electronic device. With some ceremony, as appropriate, the standing handbag rack may be brought to a patron table, the height of the tray may be adjusted to the seated patron. The patron may then hang ones coat, handbag, or the like, on the rack. The tray allows one to charge their personal electronic device. Both handbag and personal electronic device are always within convenient reach during the dining experience. Multiple patrons may use the same rack simultaneously, creating a mutually favorable experience The hooks for receiving the handbag are nestled or shielded from the tray, with curved hooks to minimize inadvertent catching of an individual or item and to increase the theft deterrent effect by requiring a more obvious removal of the handbag from the hook.

When not in use, the rack may be positioned in its lowest position for stowing away. The present invention therefore provides a standing handbag rack with charging station, comprising a vertical extending support structure having an upper portion and a lower portion; a base secured to the lower portion of the vertical extending support structure; one or more hooks for receiving a handbag or the like, the hooks are secured to the standing handbag rack; a tray having an upper surface and a lower surface, the tray secured to the vertical extending support structure, the tray adapted for receiving a portable electronic device; one or more power connectors mounted to the standing handbag rack, the power connector adaptable for coupling to a portable electronic device; a battery housing secured to the standing handbag rack; a cable having a first end and a second end, the first end connected to the power connector, and the second end extending to the battery housing and adapted for coupling to a removable and rechargeable battery, for charging the portable electronic device.

The present invention further provides a standing handbag rack with charging station, comprising a vertical extending support structure having an upper portion and a lower portion; a base secured to the lower portion of the vertical extending support structure; one or more hooks for receiving a handbag or the like, the hooks are secured to the standing handbag rack; a tray secured to the vertical extending support structure, the tray including one or more cable openings, the tray adapted for receiving a portable electronic device; one or more power connectors provided at the tray, the power connector adaptable for coupling to a portable electronic device; a battery housing secured to the standing handbag rack; at least one cable, the cable having a first end and a second end, the first end connected to a power connector adaptable for extending through the cable opening for coupling to a portable electronic device, and the second end extending to the battery housing for coupling to a removable and rechargeable battery, for charging the portable electronic device.

The tray may accommodate a variety of items in addition to the personal electronic device. Similarly, the battery housing may accommodate a variety of items in addition to the removable charging battery.

BRIEF DESCRIPTION OF THE DRAWINGS

FIG. 1 is a perspective view of the standing coat or handbag rack with a charging station, in accordance with a first embodiment of the invention.

FIG. 2 is a side section view of the standing handbag rack with a charging station, as shown in FIG. 1.

FIG. 3 is a top view of the standing handbag rack with a charging station, as shown in

FIG. 1.

DETAILED DESCRIPTION OF THE INVENTION

Figure 4:
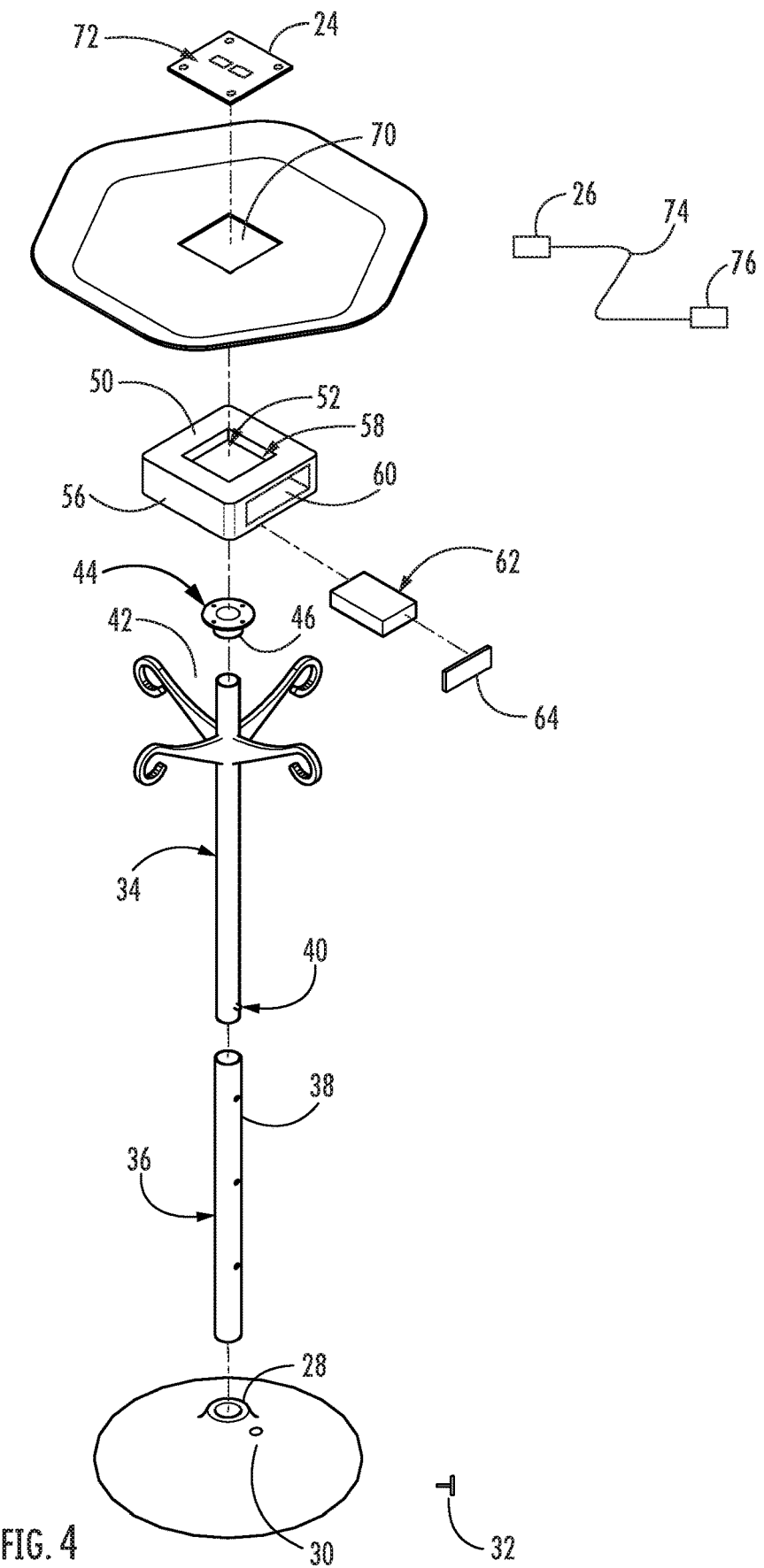
FIG. 4 is an exploded perspective view of the standing handbag rack with a charging station, with a removable charging battery and cord shown as is used in connection with the standing handbag rack.

A standing coat or handbag rack with charging station 10 or handbag rack 10 is shown in FIG. 1. The handbag rack 10 includes a vertical extending support structure or pole 12, extending upward from a base 14, a plurality of handbag hooks 16 extending from the pole, and a tray 18 secured to an upper end 20 of the pole. FIG. 2 shows a side view of the handbag rack 10. It can be seen from FIG. 2 that the handbag rack includes a battery housing 22 located between the upper end 20 of the pole 12 and the tray 18. However, it will be appreciated that the battery housing 22 may be located elsewhere. FIG. 3 shows a top view of the handbag rack 10. As can be seen from FIG. 3, the handbag hooks 16 do not extend beyond the perimeter defined by the base 14 and tray

18. FIGS. 1 and 3 show that the tray includes a square shaped plate 24 having two flush-mounted connectors 26.

FIG. 4 shows an exploded perspective view of the standing handbag rack with a charging station. In this embodiment, the base is a cast metal base with a faux wood finish. The base includes a vertical bore 28 for receiving the pole. A small threaded hole 30 extends through the side of the base in a generally horizontal direction and into the cavity formed by the vertical bore. A threaded bolt or fastener 32 is threaded into the threaded hole of the base to engage the pole received by the vertical bore and secure the pole in place. Alternatively, the fastener 32 may be provided under the base and out of sight for a more pleasing appearance.

The pole is shown to include an upper pole portion 34 and a lower pole portion 36. The lower pole portion or outer pole has an inner diameter and the upper pole portion or inner pole has an outer diameter. The inner pole is brushed metal finish and the outer pole includes a faux wood finish. The inner diameter is slightly larger than the outer diameter, so that the inner pole may be received by the outer pole. The outer pole includes a plurality of vertically spaced height adjustment holes 38 and the inner pole includes a height adjustable spring biased button mechanism 40. The height of the tray may be adjusted by the hole selected for locking engagement with the height adjustable spring biased button mechanism.

The plurality of handbag hooks are shown extending radially outward from the upper portion of the upper pole. The handbag hooks may be welded to the pole or secured via other means, including fasteners (not shown). The hooks extend initially generally horizontally with a slight vertical rise, and then curve downward and inward to form an inwardly curved hook portion and a curved distal end portion.

The upper pole portion includes a threaded end portion 42. A threaded pipe flange 44 is provided which includes a threaded end 46 and a flange end 48. The threaded end of the pipe flange is threaded to the threaded end portion of the upper pole.

A battery housing 22 includes an upper surface 50 with an opening 52, and lower surface 54, and side surfaces 56 which define a compartment 58. One side 56 includes an opening 60 to receive a portable rechargeable battery 62 within the compartment. A door 64 is provided to close the battery opening 60. The lower surface of the battery housing is secured to the flange end of the threaded pipe flange, such as by welding or fasteners, or other means which will be understood.

The tray 18 includes a lower surface 66 and an upper surface 68, with an opening 70 extending through the tray. The tray is secured to the battery housing with the lower surface of the tray in facing relationship with the upper surface of the battery housing, and with the upper opening of the battery housing aligned with the opening of the tray.

A brush metal plate 24 is provide with cut-outs 72. Power connectors 26 are flush-mounted to the brush metal plate. Each power connector has one end of an approximately six inch cable or cord 74 connected to the power connector. The other end of each cord includes a connector 76 and is adapted for connecting to a portable rechargeable battery 62. The brush metal plate is secured to the tray over the opening of the tray. Thus, the cord extends from the power connectors to the compartment of the battery housing for easy connecting to the portable rechargeable battery.

It will be appreciated that the power connectors may be mounted other than flush mounted.

In one embodiment, the flush mounted power connectors 26 at the tray are female USB ports for coupling to a personal electronic device, via a user or establishment provided charging cord, and the other end of the cords 74 are male USB ports for coupling to the portable rechargeable battery. A USB-A female is the standard "host" connector type. A USB-A male is the standard "peripheral" connector type. However, it is anticipated that other standards may be used, such as to accommodate the variety of standards and personal electronic devices anticipated.

It will be appreciated that a portable or personal electronic device (not shown), such as a cell phone, smart phone or personal digital assistant, may be received in resting position upon the tray, and coupled to the battery for charging.

There are a variety of chargeable batteries to choose. Often, such batteries include multiple USB outputs, Micro USB input and USB C input/output, for example.

In another embodiment, the brush plate may be omitted, and a cord may be provided having a first end and second end. The second end may be connected to a portable rechargeable battery, with the cord extending through the compartment of the battery housing and out the opening in the tray. A user may connect the first end of the cord directly in the user's personal electronic device.

Figure 5C:
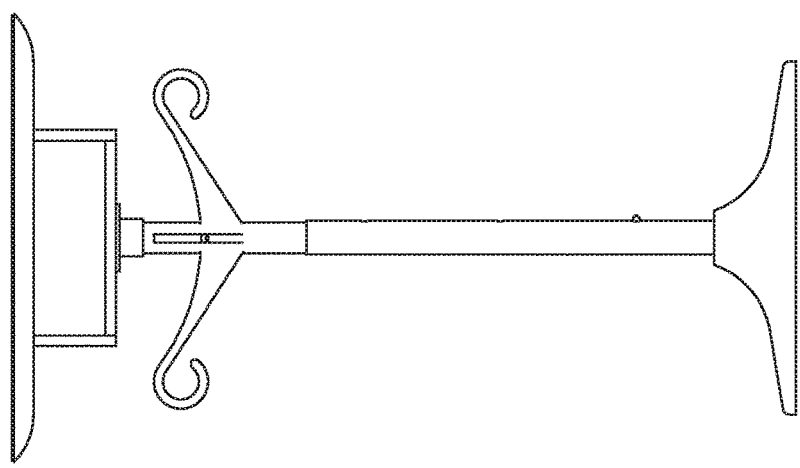
FIGS. 5a-5c is a plan view of the standing handbag rack adjusted to different heights.
Figure 5B:
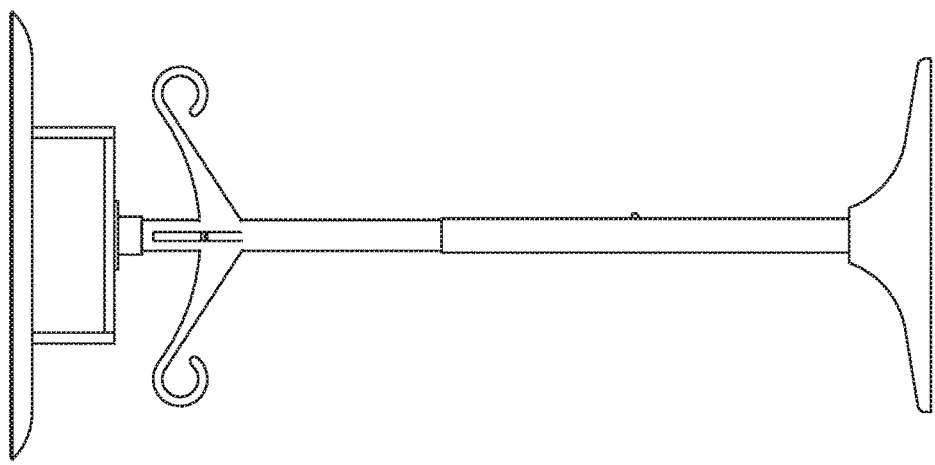
Figure 5A:
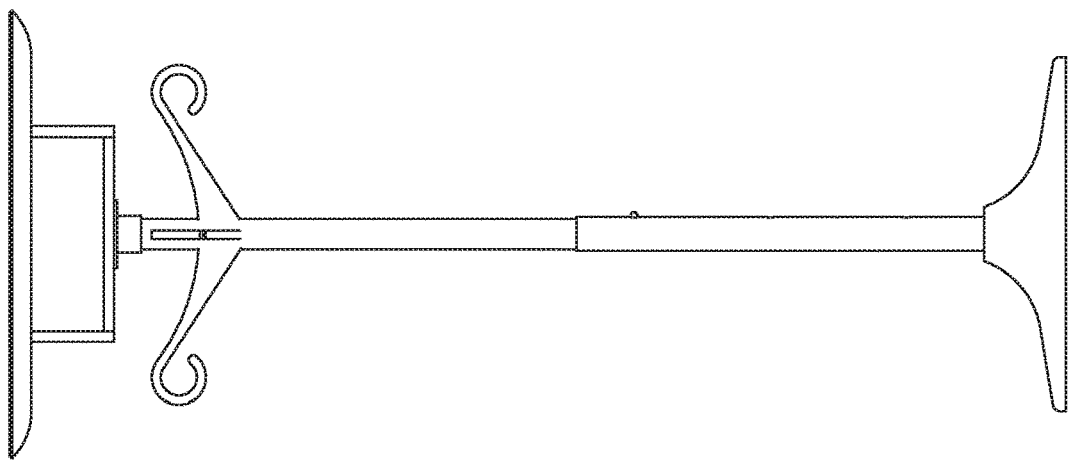

FIGS. 5*a*-5*c* is a plan view of the standing handbag rack adjusted to different heights. As will be appreciated, the inner and outer poles may be adjusted to various heights and secured in place by means of the height adjustable spring biased button mechanism. As an example, the rack might be adjustable to an overall height of approximately 37 inches as shown in FIG. 5*a*, 32 inches as shown in FIG. 5*b*, and 27 inches as shown in FIG. 5*c*.

Figure 6:
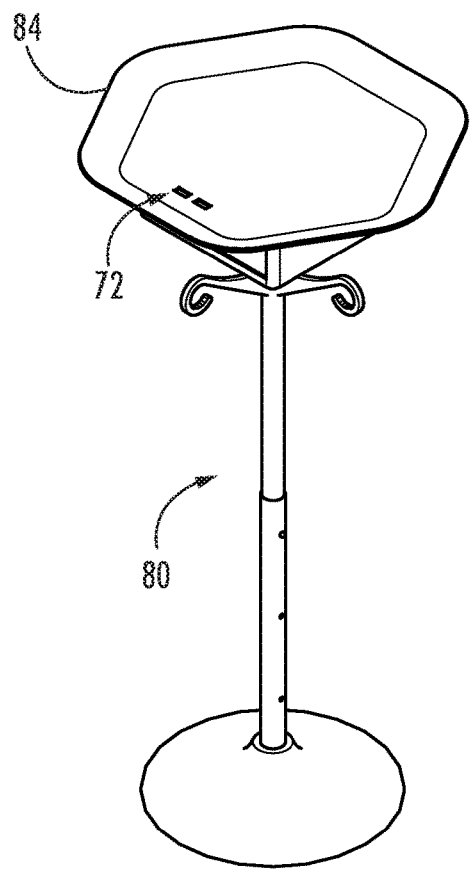
FIG. 6 is a perspective view of the standing coat or handbag rack with a charging station, in accordance with a second embodiment of the invention.

FIG. 6 is a perspective view of the standing coat or handbag rack 80 with a charging station, in accordance with a second embodiment of the invention. Where features of the second embodiment are similar to features of the first embodiment, the same reference numerals are used.

Figure 7:
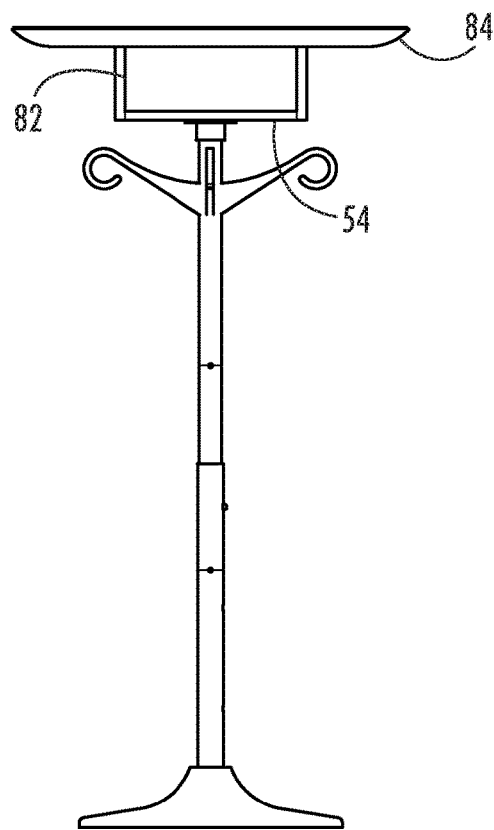
FIG. 7 is a side section view of the standing coat or handbag rack with a charging station, as shown in FIG. 6.

FIG. 7 shows that the battery housing 82 of the second embodiment is larger than the battery housing 22 of the first embodiment. The battery housing 82 of the second embodiment is larger to accommodate other items. For example, the battery housing 82 might be used to store a house deck of cards, dice, small pads of paper and pencils.

Figure 8:
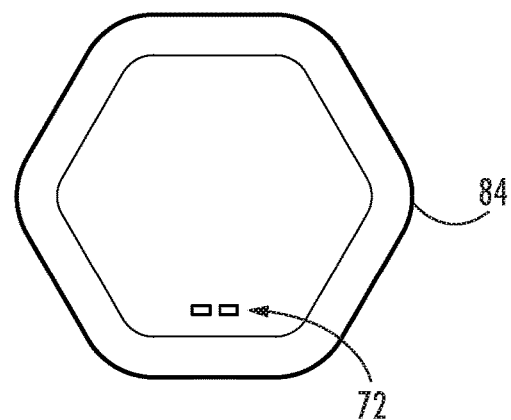
FIG. 8 is a top view of the standing coat or handbag rack with a charging station, as shown in FIG. 6.
Figure 9:
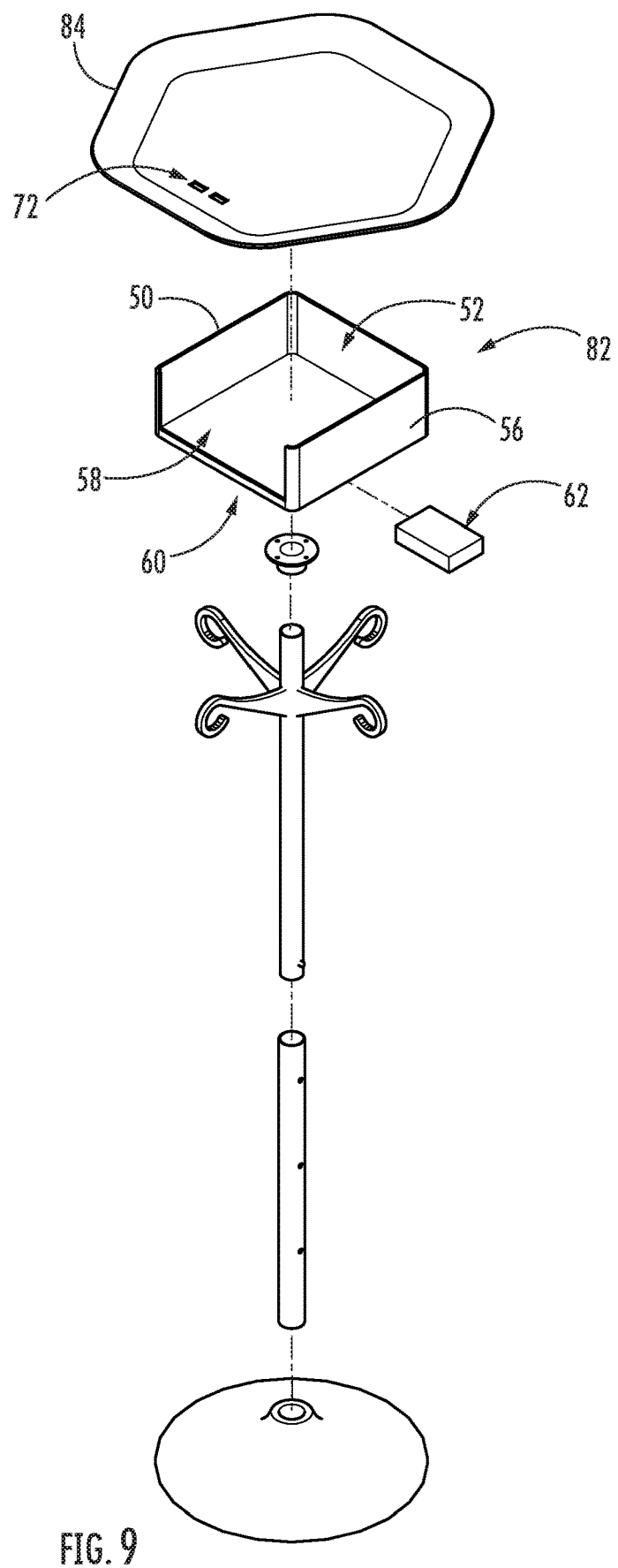
FIG. 9 is an exploded perspective view of the standing coat or handbag rack with a charging station, with a removable charging battery and cord shown as is used in connection with the standing handbag rack.

FIG. 8 shows that the tray 84 of the second embodiment is larger than the tray 18 of the first embodiment. The larger tray 84 may hold drinks, snacks, as well as phones and laptops, for example. The tray 84 of FIG. 8 is shown to include openings 72 for routing a cable through the opening or alternatively to secure a power connector 26, such as a USB port. The openings are shown off center of the tray 84 to accommodate larger items on the tray 84. However, other locations for the openings 72 and location of the power connectors 26 are also anticipated.

It will be appreciated that the height of the rack 80 of the second embodiment is also adjustable in a manner similar to that disclosed in FIGS. 5*a*-5*c* and the corresponding description of the first embodiment.

The invention claimed is:

1. A standing handbag rack with charging station, comprising:
   a vertical extending support structure having an upper portion and a lower portion;
   a base secured to the lower portion of the vertical extending support structure;
   one or more hooks for receiving a handbag, the hooks are secured to the standing handbag rack;

a tray having an upper surface and a lower surface, the tray secured to the vertical extending support structure, the tray adapted for receiving a portable electronic device, wherein the vertical extending support structure includes a plurality of poles wherein an inner pole is slidably and releasably received by an outer pole to provide a telescopic feature to adjust the height of the tray;

one or more power connectors mounted to the standing handbag rack, the power connector adaptable for coupling to a portable electronic device;

a battery housing secured to the standing handbag rack, the battery housing includes an upper portion and a bottom surface, the upper portion defines an opening, the battery housing further includes at least one side opening for receiving a removable and rechargeable battery;

a cable having a first end and a second end, the first end connected to the power connector, and the second end extending to the battery housing and adapted for coupling to a removable and rechargeable battery, for charging the portable electronic device;

a pipe flange, the pipe flange includes a first end and a second flange end, wherein one of the poles is an upper pole and the other pole is a lower pole, each pole has an upper end and a lower end, the upper end of the upper pole receives the first end of the pipe flange and the second flange end is positioned above the first end of the pipe flange, the bottom surface of the battery housing is secured to the second flange end, the upper portion of the battery housing is secured to the bottom surface of the tray.

2. The standing handbag rack according to claim 1, wherein the power connector includes one or more female connectors selected from the group consisting of a USB connector, micro-USB, USB-A, USB-B, USB-C connector, Lightning connector, 30-pin dock connector, and a wireless charging pad, wherein the one or more power connectors are flush mounted to the upper surface of the tray and positioned substantially below the tray, each female connector is coupled to the first end of the cable with the second end coupled to a USB-A male connector, each USB-A male connector adapted for coupling to the portable rechargeable battery.

3. The standing handbag rack according to claim 1, wherein the outer pole includes a plurality of vertically spaced height adjustment holes and the inner pole includes a spring biased button to be releasably received by one of the holes for securing the plurality of poles in a selected relative position to provide a desired height of the tray.

4. The standing handbag rack according to claim 1, wherein the pipe flange is a threaded pipe flange, the threaded pipe flange includes a first threaded end, wherein the upper end of the upper pole is threaded and receives the first threaded end of the threaded pipe flange, the bottom surface of the battery housing is secured to the second flange end, via welding or fasteners, the upper portion of the battery housing is secured to the bottom surface of the tray via welding or fasteners.

5. The standing handbag rack according to claim 4, wherein the tray is a stamped tray with a brush finish, the power connectors are secured to the tray, the base is formed of cast metal with a faux wood finish, and a fastener secures the lower pole to the base.

6. The standing handbag rack according to claim 4, wherein the battery housing includes at least one door for the side opening to secure and remove the portable rechargeable battery.

7. The standing handbag rack according to claim 1, wherein the one or more hooks extend substantially radially outward from an upper portion of the vertical extending support structure, the end of the hooks curling downward and then inward to provide a handbag receiving hook radially inward from the curved distal end of the hook, wherein each hook provides both a theft deterrent and resists snagging nearby individuals or items.

8. A standing handbag rack with charging station, comprising:

a vertical extending support structure having an upper portion and a lower portion;

a base secured to the lower portion of the vertical extending support structure;

one or more hooks for receiving a handbag, the hooks are secured to the standing handbag rack;

a tray secured to the vertical extending support structure, the tray including one or more cable openings, the tray adapted for receiving a portable electronic device, wherein the vertical extending support structure includes a plurality of poles wherein an inner pole is slidably and releasably received by an outer pole to provide a telescopic feature to adjust the height of the tray;

one or more power connectors provided at the tray, the power connector adaptable for coupling to a portable electronic device;

a battery housing secured to the standing handbag rack, the battery housing includes an upper portion and a bottom surface, the upper portion defines an opening, the battery housing further includes at least one side opening for receiving a removable and rechargeable battery;

at least one cable, the cable having a first end and a second end, the first end connected to a power connector adaptable for extending through the cable opening for coupling to a portable electronic device, and the second end extending to the battery housing for coupling to a removable and rechargeable battery, for charging the portable electronic device; and a pipe flange, the pipe flange includes a first end and a second flange end, wherein one of the poles is an upper pole and the other pole is a lower pole, each pole has an upper end and a lower end, the upper end of the upper pole receives the first end of the pipe flange and the second flange end is positioned above the first end of the pipe flange, the bottom surface of the battery housing is secured to the second flange end, the upper portion of the battery housing is secured to the bottom surface of the tray.

9. The standing handbag rack according to claim 8, wherein the power connector includes one or more female connectors selected from the group consisting of a USB connector, micro-USB, USB-A, USB-B, USB-C connector, Lightning connector, 30-pin dock connector, and a wireless charging pad, each female connector is coupled to the first end of the cable with the second end coupled to a USB-A male connector, each USB-A male connector adapted for coupling to a portable rechargeable battery.

10. The standing handbag rack according to claim 8, wherein the tray includes one or more opening which lead to the battery housing, wherein one end of a cable is adapted to be coupled to a portable rechargeable battery and the other end may be routed through the battery housing and out the one of the openings to be accessible to a user for coupling to an electronic device for charging.

11. The standing handbag rack according to claim 8, wherein the outer pole includes a plurality of vertically spaced height adjustment holes and the inner pole includes a spring biased button to be releasably received by one of the holes for securing the plurality of poles in a selected relative position to provide a desired height of the tray.

12. The standing handbag rack according to claim 8, wherein the pipe flange is a threaded pipe flange, the threaded pipe flange includes a first threaded end, wherein the upper end of the upper pole is threaded and receives the first threaded end of the threaded pipe flange, the bottom surface of the battery housing is secured to the second flange end, via welding or fasteners, the upper portion of the battery housing is secured to the bottom surface of the tray via welding or fasteners.

13. The standing handbag rack according to claim 12, wherein the tray is a stamped tray with a brush finish, the tray includes an opening, the base is formed of cast metal with a faux wood finish, and a fastener secures the lower pole to the base.

14. The standing handbag rack according to claim 12, wherein the battery housing includes at least one door for the side opening to secure and remove the portable rechargeable battery.

15. The standing handbag rack according to claim 8, wherein the one or more hooks extend substantially radially outward from an upper portion of the vertical extending support structure, the end of the hooks curling downward and then inward to provide a handbag receiving hook radially inward from the curved distal end of the hook, wherein each hook provides both a theft deterrent and resists snagging nearby individuals or items.

* * * * *